(12) United States Patent
Hansel et al.

(10) Patent No.: US 11,390,711 B2
(45) Date of Patent: Jul. 19, 2022

(54) PREPARATIONS HAVING IMPROVED EFFICACY AS FLAME RETARDANTS

(71) Applicant: LANXESS Deutschland GmbH, Cologne (DE)

(72) Inventors: Jan-Gerd Hansel, Gladbach (DE); Heiko Tebbe, Dormagen (DE)

(73) Assignee: LANXESS Deutschland GmbH, Cologne (DE)

( * ) Notice: Subject to any disclaimer, the term of this patent is extended or adjusted under 35 U.S.C. 154(b) by 257 days.

(21) Appl. No.: 16/690,552

(22) Filed: Nov. 21, 2019

(65) Prior Publication Data
US 2020/0165382 A1   May 28, 2020

(30) Foreign Application Priority Data
Nov. 28, 2018 (EP) .................. 18208789

(51) Int. Cl.
| | | |
|---|---|---|
| *C08G 18/48* | (2006.01) | |
| *C08K 5/521* | (2006.01) | |
| *C08G 63/692* | (2006.01) | |
| *C08G 18/18* | (2006.01) | |
| *C08G 18/24* | (2006.01) | |
| *C08G 18/42* | (2006.01) | |
| *C08G 18/75* | (2006.01) | |
| *C08J 3/20* | (2006.01) | |
| *C08J 9/00* | (2006.01) | |
| *C08J 9/12* | (2006.01) | |
| *C08L 75/04* | (2006.01) | |

(52) U.S. Cl.
CPC ....... *C08G 63/692* (2013.01); *C08G 18/1833* (2013.01); *C08G 18/242* (2013.01); *C08G 18/42* (2013.01); *C08G 18/48* (2013.01); *C08G 18/755* (2013.01); *C08J 3/203* (2013.01); *C08J 9/0038* (2013.01); *C08J 9/125* (2013.01); *C08K 5/521* (2013.01); *C08L 75/04* (2013.01); *C08G 2110/0008* (2021.01); *C08J 2203/10* (2013.01); *C08J 2205/06* (2013.01); *C08J 2375/04* (2013.01); *C08L 2201/02* (2013.01)

(58) Field of Classification Search
CPC .. C08G 18/1833; C08G 18/242; C08G 18/42; C08G 18/4241; C08G 18/48; C08G 18/4829; C08G 18/755; C08G 18/7621; C08J 3/203; C08J 9/0038; C08J 9/125; C08J 2203/10; C08J 2205/06; C08J 2375/04; C08K 5/0066; C08K 5/51; C08K 5/521; C08L 75/04; C08L 75/06; C08L 75/08; C08L 85/02; C08L 2201/02; C09K 21/12; C09K 21/14
See application file for complete search history.

(56) References Cited

U.S. PATENT DOCUMENTS

| | | | |
|---|---|---|---|
| 2,764,565 A | 9/1956 | Peter et al. | |
| 3,580,890 A | 5/1971 | Diehr et al. | |
| 3,620,986 A | 11/1971 | Diehr et al. | |
| 3,887,483 A | 6/1975 | Morehouse | |
| 4,248,930 A | 2/1981 | Haas et al. | |
| 4,263,408 A | 4/1981 | Meyborg et al. | |
| 5,728,746 A | 3/1998 | Sicken | |
| 7,122,135 B2 | 10/2006 | Williams et al. | |
| 7,288,577 B1 | 10/2007 | Bradford et al. | |
| 7,772,303 B2 | 8/2010 | Hong et al. | |
| 9,505,694 B2 | 11/2016 | Nieuwhof et al. | |
| 9,920,081 B2* | 3/2018 | Hansel | C08G 18/42 |
| 2007/0021516 A1* | 1/2007 | Hansel | C08K 5/521 521/99 |
| 2009/0143494 A1 | 6/2009 | Mack et al. | |
| 2013/0324646 A1* | 12/2013 | De Campo | C08K 3/22 524/133 |
| 2015/0080276 A1* | 3/2015 | Hansel | C10M 105/74 521/107 |
| 2018/0291156 A1 | 10/2018 | Tebbe et al. | |
| 2019/0071556 A1 | 3/2019 | Hansel et al. | |

FOREIGN PATENT DOCUMENTS

| | | |
|---|---|---|
| DE | 16 94 142 A1 | 10/1970 |
| GB | 11 62 517 A | 8/1969 |

OTHER PUBLICATIONS

European Search Report from corresponding European Application No. 18208789, dated Apr. 24, 2019, two pages.

* cited by examiner

Primary Examiner — John M Cooney
(74) Attorney, Agent, or Firm — Nicanor A. Kohncke; Christopher L. McDavid; Ewa M. Wozniak

(57) ABSTRACT

The present invention relates to preparations having improved efficacy as flame retardants, to the use thereof and to polyurethanes containing the preparations according to the invention.

17 Claims, No Drawings

PREPARATIONS HAVING IMPROVED EFFICACY AS FLAME RETARDANTS

The present invention relates to preparations having improved efficacy as flame retardants, to the use thereof and to polyurethanes containing the flame retardant preparations according to the invention.

Polyurethane plastics are employed as materials of construction in many fields of application, such as furniture, mattresses, transport, electrical, construction and industrial insulation. A distinction is made between solid polyurethanes, for example thermoplastic polyurethanes, and polyurethane foams. Polyurethane foams are porous materials produced from polyisocyanates when these are reacted with polyols in the presence of blowing agents to form a foam which is permanently stabilized by a thermosetting polymer structure. Many different types of polyisocyanates and polyols are known and make it possible to form a very wide variety of foam types having different properties through the choice of raw materials.

To achieve the high flame retardancy requirements demanded of materials for, inter alia, automotive, railway and aeroplane interiors and also for buildings insulation, polyurethanes generally require treatment with flame retardants. A multiplicity of different flame retardants employed during synthesis or processing of the polyurethane are known to this end. In the context of the present invention the efficacy of a flame retardant which is a decisive criterion for commercial applications is to be understood as meaning the amount of flame retardant based on a standardized formulation which is necessary to pass a defined fire test.

In addition to the desired efficacy, flame retardants must exhibit numerous further properties to be successfully employable. For example they shall be compatible with different raw material types employed for producing polyurethanes and shall be processable therewith to afford defect-free end products. Liquid raw materials allowing simple logistics and good meterability are preferred for producing polyurethanes. In this connection a suitable viscosity, for example of 20 m·Pas to 1000 m·Pas at 23° C., is particularly desirable.

In addition the raw materials for polyurethane production shall cause little in the way of emissions or fogging in the finished polyurethane. Emissions are understood as meaning undesired, volatile constituents released from plastic articles under usage conditions. This phenomenon is quantifiable according to VDA 278. Fogging refers to the undesired condensation of evaporated volatile constituents from motor vehicle interiors on glass panes, in particular on the windscreen. This phenomenon is quantifiable according to DIN 75 201.

Flame retardants are furthermore increasingly required to pose the lowest possible danger to humans and the environment. Compounds regarded as problematic include for example organohalogen compounds or aryl phosphates. Against this background flame retardants which eschew halogen-based or aryl phosphate-containing substances are preferred in consumer-oriented applications.

Among the many substances proposed as flame retardants for polyurethane foams, poly(alkylene phosphates) are characterized by an advantageous profile of properties. Poly(alkylene phosphate) is generally understood as meaning a mixture of substances of formula (I)

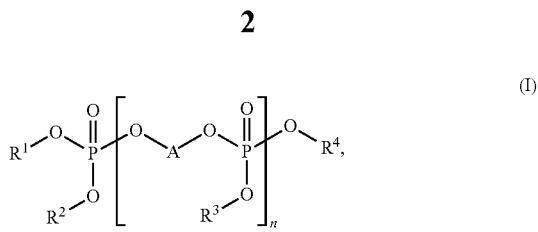

in which $R^1$ to $R^4$ represent alkyl radicals, A represents an alkylene radical optionally containing heteroatoms and n represents a number between 0 and 100. According to this definition the poly(alkylene phosphates) related to the present invention do not contain any free hydroxyl groups. Hydroxyl-containing poly(alkylene phosphates) are likewise known to those skilled in the art but have the disadvantage that their reactivity toward isocyanates can upset the sensitive chemistry of the polyurethane synthesis and are therefore often difficult to process.

Poly(alkylene phosphates) are oligomers or polymers having a molar mass distribution. The mixture of substances of formula (I) is thus characterized in that it contains various individual substances of formula (I) which differ from one another essentially in the number n of repeating units. It is therefore advantageous to characterize a poly(alkylene phosphate) having a certain molar mass distribution by the weighted average of the number of repeating units $\bar{n}$. $\bar{n}$ can be used to calculate the number-average molar mass $M_n$ of the poly(alkylene phosphate) and vice versa (see examples). The following formula applies:

$$\bar{n} = (M_n - M_E)/M_R$$

where $\bar{n}$: weighted average of the number of repeating units of the poly(alkylene phosphates) of formula (I) present in the mixture, $M_n$: number-average molar mass in g/mol (see examples, determined by gel permeation chromatography), $M_E$: sum of molar masses of end groups in g/mol and $M_R$: molar mass of repeating unit in g/mol.

Poly(alkylene phosphates) suitable for use as flame retardants in polyurethanes are known for example from WO 2002079315 A1. Preferred therein is the poly(alkylene phosphate) of formula (I) identified by CAS-number 184538-58-7 in which $R^1$ to $R^4$ represent ethyl radicals, A represents an ethylene radical, $\bar{n}$ represents a number between 2 and 20 and which does not contain any monomeric (i.e. n=0) or dimeric (i.e. n=1) constituents. This product is marketed under the trade name Fyrol® PNX. A disadvantage of Fyrol® PNX is that while it is processable with polyether polyols to afford polyurethane foams, it is not compatible with polyester polyols. Fyrol® PNX moreover has a high viscosity of 1241 mPas at 23° C.

Poly(alkylene phosphates) of formula (I) known from EP 2 687 534 A1, in which for example $R^1$ to $R^4$ represent ethyl radicals, A represents a 3-oxa-1,5-pentylene radical and $\bar{n}$ represents a number between 1.10 and 2.00, have a lower viscosity compared to Fyrol® PNX and are compatible both with polyether polyols and with polyester polyols.

Poly(alkylene phosphates) having further reduced emissions (see examples) are known from EP-A 3388479. However, the flame retardancy of these products is still too low.

Mixtures of poly(alkylene phosphates) and low molecular weight, phosphorus-based flame retardants are known for example from U.S. Pat. No. 7,288,577 B1 and EP 2 848 640 A1. The disadvantage of the mixtures described therein is that the flame retardancy of the mixtures was not higher than that of the poly(alkylene phosphates) present in any case. An improvement to the efficacy of the flame retardants in the sense defined above has thus not been comprehensively achieved. Furthermore, aryl phosphates are undesired as a mixture component in some applications on account of ecotoxicological properties.

New technologies are increasingly placing demands on flame retardants which the substances known from the prior art can no longer meet. Thus an ever increasing number of plastic components are being employed in automotive manufacture with an attendant increased fire risk. High-voltage systems and high-power batteries are being employed at the same time and represent dangerous sources of ignition in the case of a fault. In order to meet the resulting more stringent fire safety requirements there is a need for flame retardants which not only provide high efficacy but which are also ecotoxicologically unconcerning, have low emissions, are easy to handle and provide application flexibility.

The present invention accordingly has for its object to provide halogen- and aryl phosphate-free flame retardants for polyurethanes which feature low emissions, a low viscosity and a high flame retardancy and exhibit good compatibility both with polyether polyols and with polyester polyols.

This object is achieved by preparations containing not only a mixture of poly(alkylene phosphates) but also certain cyclic phosphonic esters.

The present invention accordingly provides flame retardant preparations, characterized in that they contain i) a mixture containing poly(alkylene phosphates) of formula (I)

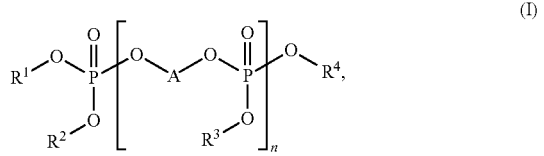

in which $R^1$, $R^2$, $R^3$ and $R^4$ each independently of one another represent an n-butyl radical or a 2-methylpropyl radical, A represents a radical of formula —$CHR^5$—$CHR^6$—(O—$CHR^7$—$CHR^8$)$_a$—, in which a represents an integer from 1 to 5 and $R^5$, $R^6$, $R^7$ and $R^8$ independently of one another represent hydrogen or methyl, and n represents an integer from 0 to 100, preferably from 0 to 50 and particularly preferably from 0 to 30, with the proviso that the poly(alkylene phosphates) of formula (I) present in the mixture differ from one another at least in the number n of repeating units and the weighted average of the number of repeating units $\bar{n}$ of the poly(alkylene phosphates) of formula (I) is in the range from 1.10 to 4.00, and ii) at least one cyclic phosphonic ester of formula (II)

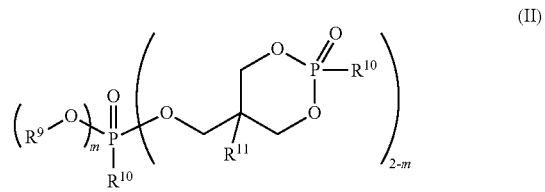

in which $R^9$, $R^{10}$ and $R^{11}$ each independently of one another represent a straight-chain or branched $C_1$- to $C_4$-alkyl radical and m represents the number 0 or 1.

It is preferable when the poly(alkylene phosphates) of formula (I) present in the preparations according to the invention are those in which a represents the number 1.

It is likewise preferable when the poly(alkylene phosphates) of formula (I) present in the preparations according to the invention are those in which the radicals $R^5$, $R^6$, $R^7$ and $R^8$ are all identical and represent hydrogen.

It is likewise preferable when the poly(alkylene phosphates) of formula (I) present in the preparations according to the invention are those in which the radicals $R^1$, $R^2$, $R^3$ and $R^4$ are all identical and represent n-butyl radicals. In an alternative likewise preferred embodiment of the invention the radicals $R^1$, $R^2$, $R^3$ and $R^4$ are all identical and represent 2-methylpropyl radicals.

It is preferable when the poly(alkylene phosphates) of formula (I) present in the preparations according to the invention have an average of the number of repeating units $\bar{n}$ in the range from 1.20 to 3.00; particularly preferably in the range from 1.03 to 2.60 and very particularly preferably in the range from 1.30 to 1.90.

In the case of the present invention the number-average molar mass $M_n$ of the poly(alkylene phosphates) of formula (I) present in the preparations according to the invention is determined by gel permeation chromatography against polystyrene standards with tetrahydrofuran as the eluent. This method is known to those skilled in the art, for example from DIN 55672-1:2007-08. The weighted average of the number of repeating units $\bar{n}$ of the poly(alkylene phosphates) present in the mixture is easily calculable from $M_n$ by taking into account the stoichiometry of formula (I) (see examples).

Very particularly preferred are preparations containing poly(alkylene phosphates) of formula (I) in which a represents the number 1, $R^5$, $R^6$, $R^7$ and $R^8$ are all identical and represent hydrogen and n represents an integer from 0 to 100, preferably from 0 to 50 and particularly preferably from 0 to 30, with the proviso that the poly(alkylene phosphates) of formula (I) present in the mixture differ from one another at least in the number n of repeating units and the weighted average of the number of repeating units $\bar{n}$ of the poly(alkylene phosphates) of formula (I) is in the range from 1.10 to 4.00, preferably from 1.20 to 3.00, particularly preferably from 1.30 to 2.60 and very particularly preferably from 1.30 to 1.90.

Likewise very particularly preferred are preparations containing poly(alkylene phosphates) of formula (I) in which
a represents the number 1,
$R^1$, $R^2$, $R^3$ and $R^4$ are all identical and represent n-butyl radicals,
$R^5$, $R^6$, $R^7$ and $R^8$ are all identical and represent hydrogen, and
n represents an integer from 0 to 100, preferably from 0 to 50 and particularly preferably from 0 to 30,
with the proviso that the poly(alkylene phosphates) of formula (I) present in the preparation differ from one another at least in the number n of repeating units and
the weighted average of the number of repeating units $\bar{n}$ of the poly(alkylene phosphates) of formula (I) is in the range from 1.10 to 4.00, preferably from 1.20 to 3.00, particularly preferably from 1.30 to 2.60 and very particularly preferably from 1.30 to 1.90.

Likewise very particularly preferred are preparations containing poly(alkylene phosphates) of formula (I) in which
a represents the number 1,
$R^1$, $R^2$, $R^3$ and $R^4$ are all identical and represent 2-methylpropyl radicals,
$R^5$, $R^6$, $R^7$ and $R^8$ are all identical and represent hydrogen and
n represents an integer from 0 to 100, preferably from 0 to 50 and particularly preferably from 0 to 30,
with the proviso that the poly(alkylene phosphates) of formula (I) present in the preparation differ from one another at least in the number n of repeating units and
the weighted average of the number of repeating units $\bar{n}$ of the poly(alkylene phosphates) of formula (I) is in the range from 1.10 to 4.00, preferably from 1.20 to 3.00, particularly preferably from 1.30 to 2.60 and very particularly preferably from 1.30 to 1.90.

The mixture containing poly(alkylene phosphates) of formula (I) is preferably characterized in that its molar mass distribution also contains the dimeric phosphoric esters of formula (I) (i.e. n=1). It is preferable when the area fraction of the dimeric phosphoric esters of formula (I) (i.e. n=1) in the molar mass distribution is 10% to 70% (area percent determined by gel permeation chromatography against polystyrene standards with tetrahydrofuran as the eluent) according to the method from DIN 55672-1:2007-08.

The poly(alkylene phosphates) present in the preparations according to the invention may in principle be produced by methods for producing alkyl phosphates known to those skilled in the art, for example those described in EP-A 2 687 534.

The preparation according to the invention preferably contains cyclic phosphonic esters of formula (II) in which $R^9$ represents methyl or ethyl. It is particularly preferable when $R^9$ represents methyl.

The preparation according to the invention preferably contains cyclic phosphonic esters of formula (II) in which $R^{10}$ represents methyl or ethyl. It is particularly preferable when $R^{10}$ represents methyl.

The preparation according to the invention preferably contains cyclic phosphonic esters of formula (II) in which $R^{11}$ represents methyl or ethyl. It is particularly preferable when $R^{11}$ represents ethyl.

The preparation according to the invention preferably contains at least two different cyclic phosphonic esters of formula (II). It is particularly preferable when at least one cyclic phosphonic ester of formula (II) where m=0 and at least one cyclic phosphonic ester of formula (II) where m=1 are present.

The cyclic phosphonic esters of formula (II) present in the preparations according to the invention are commercially available or may be produced by known methods.

The flame retardant preparations according to the invention are preferably halogen-free. In the context of the present invention the term "halogen-free" is to be understood as meaning that the components of the preparation do not contain the elements fluorine, chlorine, bromine and/or iodine and that the preparations contain no other substances in an amount sufficient to bring about a content of one or more of the elements fluorine, chlorine, bromine and iodine of more than 5000 ppm based on the preparation.

It is preferable when the flame retardant preparation according to the invention contains 60% to 99.9% by weight of the mixture containing poly(alkylene phosphates) of formula (I) and 0.1% to 40% by weight of at least one cyclic phosphonic ester of formula (II) based on the total preparation. It is particularly preferable when the phosphoric ester preparation according to the invention contains 70% to 99% by weight of mixture containing poly(alkylene phosphates) and 1% to 30% by weight of at least one cyclic phosphonic ester of formula (II) based on the total preparation.

It is preferable when the flame retardant preparations according to the invention are substances liquid at 23° C. It is preferable when the flame retardant preparations according to the invention have a viscosity between 20 and 1000 mPas at 23° C. It is particularly preferable when the viscosity at 23° C. is 20 to 900 mPa·s.

The flame retardant preparations according to the invention may preferably contain not only the mixture containing poly(alkylene phosphates) of formula (I) and cyclic phosphonic esters of formula (II) but also depending on the field of application one or more auxiliaries, preferably from the group of solvents, antioxidants, stabilizers and dyes. Suitable auxiliaries of this kind include for example:
  solvents, for example alkyl esters of aliphatic or aromatic di- or tricarboxylic acids,
  antioxidants and stabilizers, for example sterically hindered trialkylphenols, alkyl esters of 3-(3,5-di-tert-butyl-4-hydroxyphenyl)propionic acid, benzofuran-2-ones, secondary aromatic amines, phosphites, phenothiazines or tocopherols, and
  dyes, for example soluble organic dyes, iron oxide pigments or carbon blacks.

The flame retardant preparations according to the invention are suitable for use as flame retardants, preferably for polyurethanes. The present invention further provides for the use of the flame retardant preparations according to the invention as flame retardants in polyurethanes.

The flame retardant preparations may be used in all applications known to those skilled in the art for flame retardant polyurethanes, especially preferably in thermoplastic polyurethanes, polyurethane foams, polyurethane elastomers, thermoplastic polyurethanes, polyurethane coatings and paints, polyurethane adhesives and binders or polyurethane fibres. It is preferable when the preparations are used in polyurethane foams. It is particularly preferable when the preparations are used in flexible polyurethane foams. It is very particularly preferable when the preparations are used in flexible polyurethane foams produced from polyether polyols, i.e. for flexible polyether polyurethane foams. In an alternative likewise very particularly preferred embodiment of the invention the preparations are used in flexible polyurethane foams produced from polyester polyols, i.e. for flexible polyester polyurethane foams.

The present invention moreover likewise provides polyurethanes containing at least one flame retardant preparation according to the invention. These polyurethanes may be produced to be flame retardant through suitable choice of the amount of flame retardant preparations present.

The flame retardant polyurethanes according to the invention are producible by reacting organic polyisocyanates with compounds having at least two isocyanate-reactive hydrogen atoms with customary blowing agents, stabilizers, activators and/or further customary auxiliary and additive substances in the presence of at least one flame retardant preparation according to the invention. The compounds having at least two isocyanate-reactive hydrogen atoms are referred to as the polyol component.

The flame retardant preparations according to the invention are employed in an amount of 0.5 to 30 parts by weight, preferably 3 to 25 parts by weight, based on 100 parts by weight of polyol component.

The polyurethanes are polymers based on isocyanate and containing predominantly urethane and/or isocyanurate and/or allophanate and/or uretdione and/or urea and/or carbodiimide groups. The production of isocyanate-based polymers is known per se and described for example in DE-OS 16 94 142, DE-OS 16 94 215 and DE-OS 17 20 768 and also in Kunststoff-Handbuch volume VII, Polyurethane, edited by G. Oertel, Carl Hanser Verlag Munich, Vienna 1993.

The flame-retardant polyurethanes according to the invention are preferably thermosetting polyurethanes, polyisocyanurates, polyurethane foams, polyurethane elastomers, thermoplastic polyurethanes, polyurethane coatings and polyurethane paints, polyurethane adhesives and binders or polyurethane fibres.

In a preferred embodiment of the invention the flame retardant polyurethanes according to the invention are flame retardant polyurethane foams.

Polyurethane foams are broadly distinguished into flexible and rigid foams. Although flexible and rigid foams may in general exhibit roughly the same envelope density and composition, flexible polyurethane foams exhibit only a low degree of crosslinking and offer only scant resistance to deformation under compressive stress. By contrast, the structure of rigid polyurethane foams consists of highly crosslinked units and the deformation resistance of the rigid polyurethane foam under compressive stress is very high. The typical rigid polyurethane foam is closed-cell and exhibits only low thermal conductivity. Primary factors influencing the subsequent foam structure and properties thereof during the production of polyurethanes via reaction of polyols with isocyanates are the structure and molar mass of the polyol, and the reactivity and number (functionality) of hydroxyl groups present in the polyol. Further details concerning rigid and flexible foams, the starting materials that can be used to produce these, and also processes for producing same, may be found in Norbert Adam, Geza Avar, Herbert Blankenheim, Wolfgang Friederichs, Manfred Giersig, Eckehard Weigand, Michael Halfmann, Friedrich-Wilhelm Wttbecker, Donald-Richard Larimer, Udo Maier, Sven Meyer-Ahrens, Karl-Ludwig Noble and Hans-Georg Wussow: "Polyurethanes", Ullmann's Encyclopedia of Industrial Chemistry Release 2005, Electronic Release, 7th ed., chap. 7 ("Foams"), Wiley-VCH, Weinheim 2005.

It is preferable when the polyurethane foams according to the invention have envelope densities of 10-150 kg/m$^3$. It is particularly preferable when they have envelope densities of 20-50 kg/m$^3$.

The isocyanate-based foams are produced using the following starting components:
1) Aliphatic, cycloaliphatic, araliphatic, aromatic and heterocyclic polyisocyanates (for example W. Siefken in Justus Liebigs Annalen der Chemie, 562, p. 75-136), for example those of formula Q(NCO)$_n$, in which n=2 to 4, preferably 2 to 3, and Q is an aliphatic hydrocarbon radical having 2 to 18, preferably 6 to 10, carbon atoms, a cycloaliphatic hydrocarbon radical having 4 to 15, preferably 5 to 10, carbon atoms, an aromatic hydrocarbon radical having 6 to 15, preferably 6 to 13, carbon atoms or an araliphatic hydrocarbon radical having 8 to 15, preferably 8 to 13, carbon atoms. Particular preference is generally given to the industrially readily obtainable polyisocyanates derived from 2,4- and/or 2,6-tolylene diisocyanate and/or from 4,4'- and/or 2,4'-diphenylmethane diisocyanate.
2) Compounds having at least two isocyanate-reactive hydrogen atoms and a molecular weight of 400 to 8000 g/mol ("polyol component"). This is to be understood as meaning not only amino-, thio- or carboxyl-containing compounds but preferably hydroxyl-containing compounds, in particular compounds having 2 to 8 hydroxyl groups. If the polyurethane foam is to be a flexible foam, it is preferable to use polyols having molar masses of 2000 to 8000 g/mol and 2 to 6 hydroxyl groups per molecule. If, by contrast, a rigid foam is to be produced, it is preferable to use highly branched polyols having molar masses of 400 to 1000 g/mol and 2 to 8 hydroxyl groups per molecule. The polyols are polyethers and polyesters and also polycarbonates and polyesteramides such as are known per se for the production of homogeneous and of cellular polyurethanes and as are described for instance in DE-OS 28 32 253. The polyethers and polyesters having at least two hydroxyl groups are preferred according to the invention.

The polyurethane foams according to the invention can thus be produced as rigid or flexible foams through appropriate choice of the starting materials as easily derivable from the prior art.

Further starting components may include compounds having at least two isocyanate-reactive hydrogen atoms and a molecular weight of 32 to 399 g/mol. In this case too this is to be understood as meaning hydroxyl- and/or amino- and/or thio- and/or carboxyl-containing compounds, preferably hydroxyl- and/or amino-containing compounds, which serve as chain extenders or crosslinkers. These compounds generally have 2 to 8, preferably 2 to 4, isocyanate-reactive hydrogen atoms. Examples thereof are likewise described in DE-OS 28 32 253.
3) Water and/or volatile organic substances as blowing agents, for example n-pentane, i-pentane, cyclopentane, acetone, halogen-containing alkanes, such as trichloromethane, methylene chloride or chlorofluoroalkanes, $CO_2$ and others.
4) Optionally co-used are auxiliary and additive agents, such as catalysts of the type known per se, for example alkyl-substituted amines, amidines and guanidines, organotin compounds or organophosphorus compounds, surface-active additive substances, such as emulsifiers and foam stabilizers, reaction retarders, e.g. acidic substances such as hydrochloric acid or organic acid halides, also cell regulators of the type known per se, such as paraffins or fatty alcohols and dimethylpolysiloxanes and also pigments or dyes and further flame retardants, also stabilizers against ageing and weathering effects, for example epoxy compounds or carbodiimides, scorch inhibitors, plasticizers, fungistatic and bacteriostatic substances and also fillers, such as barium sulfate, diatomaceous earth, carbon black or whiting (DE-OS 27 32 292). Scorch inhibitors that may be present include in particular sterically hindered trialkylphenols, alkyl esters of 3-(3,5-di-tert-butyl-4-hydroxyphenyl)-propionic acid, benzofuran-2-ones, secondary aromatic amines, phosphites, phenothiazines or tocopherols.

Further flame retardants that may be present in the polyurethanes according to the invention in addition to the flame retardant preparations according to the invention include the following compounds:

organic phosphorus compounds, for example triethylphosphate, triphenylphosphate, diphenyl cresyl phosphate, tricresyl phosphate, isopropylated or butylated aryl phosphates, aromatic bisphosphates, neopentylglycol bis(diphenylphosphate), chlorine-containing phosphoric esters such as for example tris(chloroisopropyl) phosphate or tris(dichloropropyl) phosphate, dimethylmethane phosphonate, diethylethane phosphonate, dimethylpropane phosphonate, diethylphosphinic acid derivatives and salts, other oligomeric phosphates or phosphonates, hydroxyl-containing phosphorus compounds, 5,5-dimethyl-1,3,2-dioxaphosphorinane 2-oxide derivatives, 9,10-dihydro-9-oxa-10-phosphaphenanthrene 10-oxide (DOPO) and directives thereof, inorganic phosphorus compounds, for example ammonium phosphate, ammonium polyphosphate, melamine phosphate, melamine polyphosphate, nitrogen compounds, for example melamine, melamine cyanurate, bromine compounds, for example alkyl esters of a tetrabromobenzoic acid, bromine-containing diols produced from tetrabromophthalic anhydride, bromine-containing polyols, bromine-containing diphenyl ethers or inorganic flame retardants, for example aluminium hydroxide, boehmite, magnesium hydroxide, expandable graphite or clay minerals.

Further examples of optionally inventively co-usable surface-active additive substances and foam stabilizers and also cell regulators, reaction retarders, stabilizers, flame-retardant substances, plasticizers, dyes and fillers and also fungistatic and bacteriostatic substances and also details concerning the mode of use and the mode of action of these additive agents are described in Kunststoff-Handbuch, volume VII, Carl-Hanser-Verlag, Munich, 1993, on pages 104 to 123.

The present invention further provides a process for producing polyurethanes by reaction of organic polyisocyanates with compounds having at least two isocyanate-reactive hydrogen atoms and customary blowing agents, stabilizers, catalysts, activators and/or further customary auxiliary and additive substances at 20° C. to 80° C. in which at least one phosphoric ester preparation according to the invention is employed in an amount of 0.5 to 30 parts by weight based on 100 parts by weight of polyol component. The phosphoric ester preparations are preferably employed in an amount of 3 to 25 parts by weight based on 100 parts by weight of polyol component.

To perform the process for producing polyurethanes according to the invention, the reaction components described hereinabove are reacted by the known-per-se one-step process, the prepolymer process or the semi-prepolymer process, often with the help of mechanical devices, for example those described in U.S. Pat. No. 2,764,565. Details of processing equipment also contemplated according to the invention are described in Kunststoff-Handbuch, volume VII, Polyurethane, edited by G. Oertel, Carl-Hanser-Verlag, Munich, Vienna 1993, on pages 139 to 192.

The process according to the invention also makes it possible to produce cold-curing foams (GB-PS 11 62 517, DE-OS 21 53 086). However, it will be appreciated that foams may also be produced by block foaming or by the double conveyor belt process known per se. Polyisocyanurate foams are produced by the processes and under the conditions known therefor.

The process according to the invention allows production of polyurethane foams as rigid or flexible foams in continuous or discontinuous fashion or as foamed moulded articles. The process according to the invention is preferred for use in the production of flexible foams produced by a block foaming process.

The polyurethanes obtainable according to the invention are preferably employed in furniture cushioning, textile inserts, mattresses, vehicle seats, armrests, components, seat or dashboard trim, cable sheathing, seals, coatings, paints, adhesives, adhesion promoters or fibres.

The examples which follow more particularly elucidate the invention without any intention to limit the invention.

EXAMPLES

Synthesis Examples

General Synthesis Procedure for Mixtures Containing Poly(Alkylene Phosphates) of Formula (I) According to EP-A 3388479 (Synthesis Examples S1 to S5)

A reactor fitted with a stirrer, dropping funnel, reflux cooler and vacuum apparatus was filled with the amount (parts by weight) of phosphorus oxychloride specified in table 1. The phosphorus oxychloride was temperature controlled to 10° C. to 20° C. Under a vacuum in the range from 500 to 700 mbar the amount of diethylene glycol specified in table 1 was added dropwise. On completion of the dropwise addition the pressure was reduced further to a final pressure of 5 to 15 mbar and the temperature raised to 20° C. to 30° C. A virtually colourless, liquid residue remained.

In a further reactor fitted with a stirrer, dropping funnel and reflux cooler the amount of 2-methylpropanol/n-butanol specified in table 1 was initially charged at 20° C. to 30° C. and admixed with the residue obtained above. The mixture was subjected to further stirring at a temperature in the range from 20° C. to 30° C. until the reaction had abated and then neutralized by addition of aqueous sodium hydroxide solution. Two clear liquid phases were formed. These were separated and the organic phase was freed of excess reagent by distillation. The distillation residue was washed with water and finally residual water was removed by distillation. The mixtures remained as residue in the form of colourless liquids.

Synthesis Procedure for a Mixture Containing Poly(Alkylene Phosphates) According to EP-A 2 687 534 (Synthesis Example S6)

A reactor fitted with a stirrer, dropping funnel, reflux cooler and vacuum apparatus was filled with the amount (parts by weight) of phosphorus oxychloride specified in table 1. The phosphorus oxychloride was temperature controlled to a temperature of 10° C. to 20° C. Under a vacuum in the range from 500 to 700 mbar the amount of diethylene glycol specified in table 1 was added dropwise. On completion of the dropwise addition the pressure was reduced further to a final pressure of 5 to 15 mbar and the temperature raised to 20° C. to 30° C. A virtually colourless, liquid residue remained.

In a further reactor fitted with a stirrer, dropping funnel and reflux cooler the amount of ethanol specified in table 1 was initially charged at a temperature in the range from 20° C. to 30° C. and admixed with the residue obtained above. The mixture was subjected to further stirring at 20° C. to 30° C. until the reaction had abated and then neutralized by addition of concentrated aqueous sodium hydroxide solution. This was followed by addition of sufficient dichloromethane and water to form two clear liquid phases. These were separated and the organic phase was freed of dichloromethane, excess ethanol and water by distillation. The oligomer mixture remained as residue in the form of a colourless liquid.

Determination of Weighted Average of the Number of Repeating Units $\bar{n}$ in the Mixtures S1 to S6

The products produced in the synthesis examples 51 to S6 were revealed to be mixtures through analysis by gel permeation chromatography (GPC). The number-average molar masses $M_n$ of the mixtures were determined by GPC against polystyrene standards with tetrahydrofuran as the eluent in accordance with the method from DIN 55672-1:2007-08. The weighted average of the number of repeating units $\bar{n}$ of the poly(alkylene phosphates) of formula (I) present in the mixture was calculated from the measured number-average molar mass $M_n$ according to the following formula:

$$\bar{n}=(M_n-M_E)/M_R$$

where $\bar{n}$: weighted average of the number of repeating units of the poly(alkylene phosphates) of formula (I) present in the mixture,
$M_n$: number-average molar mass in g/mol determined by gel permeation chromatography in accordance with the method from DIN 55672-1:2007-08,
$M_E$: sum of molar masses of end groups in g/mol and
$M_R$: molar mass of repeating unit in g/mol.

For the mixtures 51 to S5 composed of poly(alkylene phosphates) of formula (I) where $R^1=R^2=R^3=R^4$=n-butyl or 2-methylpropyl and A=—$CH_2CH_2OCH_2CH_2$— where a=1, $M_E$=266.31 g/mol and $M_R$=224.19 g/mol. For the noninventive comparative substance S6 composed of poly(alkylene phosphates) of formula (I) where $R^1=R^2=R^3=R^4$=ethyl and A=$CH_2CH_2OCH_2CH_2$— where a=1, $M_E$=182.16 g/mol and $M_R$=194.14 g/mol. The results are shown in table 1.

TABLE 1

Raw materials employed (parts by weight) for production of the mixtures (synthesis examples S1 to S5) and of comparative substance S6 and results of gel permeation chromatography

| Example | S1 | S2 | S3 | S4 | S5 | S6 |
|---|---|---|---|---|---|---|
| Phosphorus oxychloride | 149.6 | 182.8 | 154.1 | 151.7 | 154.1 | 306.7 |
| Diethylene glycol | 74.0 | 68.3 | 62.7 | 66.3 | 62.7 | 118.7 |
| 2-Methylpropanol | 380.0 | 500.0 | 444.7 | 360.0 | | |
| n-Butanol | | | | | 444.7 | |
| Ethanol | | | | | | 618.2 |
| Area fraction of dimer (i.e. n = 1) | 27% | 66% | 53% | 41% | 51% | 43% |
| $M_n$ [g/mol] | 844 | 608 | 656 | 709 | 649 | 462 |
| $\bar{n}$ | 2.58 | 1.53 | 1.74 | 1.97 | 1.71 | 1.44 |

In addition to the synthesis products recited in table 1 production of the flame retardant preparations also employed the following substances:

Fyrol® PNX Commercially available product from ICL-IP Bitterfeld GmbH, poly(alkylene phosphate) of formula (I) in which R1 to R4 represent ethyl radicals, A represents an ethylene radical, $\bar{n}$ represents a number between 2 and 20 and which does not contain any monomeric (i.e. n=0) or dimeric (i.e. n=1) constituents.

Gel permeation chromatography under the abovementioned conditions indicated an area fraction of the dimer (i.e. n=1) of 2.4%, a number-average molar mass $M_n$ of 640 g/mol, and taking into account the values for $M_E$=182.16 g/mol and $M_R$=152.09 g/mol, thus a weighted average of the number of repeating units 1.7 of 3.01.

Amgard® CU Commercially available product from Lanxess Deutschland GmbH, mixture of cyclic phosphonic esters of formula (II) where m=0 and m=1 and R9, R10=methyl and R11=ethyl.

Production of the Inventive Flame Retardant Preparations

The components listed in table 2 were weighed in in the specified mass ratios and under a nitrogen atmosphere stirred with a mechanical stirrer at 300 rpm at 25° C.

Viscosities of the Components and of the Flame Retardant Preparations

The viscosities of the raw materials employed and the produced flame retardant preparations were determined at 23° C. with a commercially available falling ball viscometer and are listed in table 2.

TABLE 2

Composition of flame retardant preparations and viscosities

| Example | Mixture (type) | Mixture (parts by mass) | Amgard ® CU (parts by mass) | Viscosity (mPa · s/ 23° C.) |
|---|---|---|---|---|
| V1 | S1 | 100 | 0 | 315 |
| V2 | S2 | 100 | 0 | 79 |
| V3 | S3 | 100 | 0 | 97 |
| V4 | S4 | 100 | 0 | 138 |
| V5 | S5 | 100 | 0 | 93 |
| V6 | S6 | 100 | 0 | 58 |
| V7 | Fyrol ® PNX | 100 | 0 | 1241 |
| V8 | none | 0 | 100 | 302,270 |
| B1 | S1 | 75 | 25 | 968 |
| B2 | S2 | 75 | 25 | 298 |
| B3 | S3 | 75 | 25 | 350 |
| B4 | S4 | 75 | 25 | 462 |
| V10 | S6 | 75 | 25 | 350 |
| V9 | Fyrol ® PNX | 75 | 25 | 3,473 |

B1-B4 = inventive examples

Evaluation of Results of Gel Permeation Chromatography and Viscosity Measurement The molar mass distribution of the for producing the mixtures 51 to S5 features a proportion of the dimer, i.e. of the poly(alkylene phosphate) of formula (I) where n=1, of 27% to 66%. By contrast, the comparative material Fyrol PNX contains only 2.4% of dimer.

The viscosity of Amgard® CU (comparative example V8) of 302.270 mPas (23° C.) is of a magnitude such that handling and processing with the apparatus customary for producing polyurethanes encounters significant technical problems. The viscosities of the inventive flame retardant preparations B1 to B4 are all in the preferred range of 20 mPa·s to 1000 mPa·s (23° C.) and thus lower than the viscosity of Fyrol PNX (comparative example V7) and a flame retardant preparation composed of Fyrol PNX and Amgard CU (comparative example V9).

The noninventive mixture S6 (see comparative example V6) and a mixture produced therefrom with Amgard® CU (see comparative example V10) feature acceptable viscosities. However, S6 causes elevated emissions in the foam (see below in table 4) and therefore has poor suitability for the purpose of the present invention.

Production of Flexible Polyurethane Foams

TABLE 3

Raw materials and usage amounts for producing flexible polyether polyurethane foams

| Component | Function | Description | Parts by mass |
|---|---|---|---|
| A | Polyol | Arcol ® 1105 (Covestro AG), polyether polyol with OHN of 56 mg KOH/g | 100 |
| B | Blowing agent | water | 3.0 |
| C | Catalyst | Addocat 108 ® (LANXESS Deutschland GmbH), 70% solution of bis(2-dimethyl-aminoethyl)ether in dipropylene glycol | 0.08 |
| D | Catalyst | Addocat ® SO (LANXESS Deutschland GmbH), tin(II) 2-ethylhexanoate | 0.16 |
| E | Stabilizer | Tegostab ® B 8232 (Evonik), silicone stabilizer | 1.0 |
| F1 | Flame retardant | Mixture V4 | see table 4 |
| F2 | Flame retardant | Mixture V6 | see table 4 |
| F3 | Flame retardant | Inventive flame retardant preparations B4 | see table 4 |
| G | Diisocyanate | Desmodur ® T 80 (Covestro AG), tolylene diisocyanate, isomer mixture | 40.9 |

OHN = hydroxyl number according to DIN 53240

Production of Flexible Polyether Polyurethane Foams

The raw materials for producing flexible polyether polyurethane foams and the usage amounts thereof are reported in table 3. The usage amounts of the flame retardants were varied systematically, see below. The raw materials with the exception of the diisocyanate (component G) were stirred together to afford a homogeneous mixture. The diisocyanate was then added and the mixture briefly subjected to vigorous stirring. After a cream time of 15-20 s and a full-rise time of 170-200 s a flexible polyether polyurethane foam having an envelope density of 33 kg/m$^3$ was obtained. All experiments afforded uniformly fine-celled foams.

Determination of Flame Retardancy

The flexible polyurethane foams (polyether and polyester) were tested in accordance with the specifications of Federal Motor Vehicle Safety Standards FMVSS-302 and classified according to the flammability ratings SE (self-extinguishing), SE/NBR (self-extinguishing/no burn rate), SE/BR (self-extinguishing/with burn rate), BR (burn rate) and RB (rapid burn). The flammability tests were carried out five times for each formulation.

In the absence of a flame retardant the flexible polyurethane foam burns rapidly (flammability rating RB). To determine the effectiveness of the flame retardants, formulations with increasing amounts of flame retardant (parts by mass per 100 parts of polyol component, php) were produced and tested. This was followed by determination of the lowest amount of flame retardant allowing the best flammability rating of SE to be achieved in each repetition. The lower this amount the greater the efficacy of the flame retardant. The results are shown in table 4.

Determination of Emissions

The flexible polyurethane foams (polyether and polyester) were tested for the release of volatile constituents according to the specifications of test method VDA 278. To determine the emissions of the VOC class the foam specimen is heat treated at 90° C. for 30 min. Determination of the emissions of the FOG class requires the same foam specimen to be heat treated at 120° C. for a further 60 min. The results are listed in table 4. Foam specimens containing the amounts of flame retardant reported in table 4 were analysed in each case.

Determination of Fogging Condensate

The fogging behaviour of the flexible polyurethane foams was analysed as per DIN 75201 B. The measured amounts of fogging condensate after storage at 100° C. for 16 hours are shown in table 4. Foam specimens containing the amounts of flame retardant reported in table 4 were analysed in each case.

TABLE 4

Efficacy, emissions and fogging condensate for the flexible polyether polyurethane foams

| Example | flame retardant | Efficacy (minimum amount for flammability rating SE in php) | VOC according to VDA 278 (ppm) | FOG according to VDA 278 (ppm) | Fogging condensate (mg) |
|---|---|---|---|---|---|
| V4 | Mixture S4 according to EP-A 3388479 | 6 | 23 | 157 | 0.38 |
| V6 | Mixture S6 according to EP-A 2 687 534 | 4 | 94 | 260 | 0.39 |
| B4 | Inventive flame retardant preparation B4 | 5 | 18 | 206 | 0.33 |

Evaluation of Results for Flexible Polyether Polyurethane Foams

The mixture S4 according to EP-A 3388479 alone (comparative example V4) shows the lowest efficacy but low emission and fogging values in the polyether foams. The mixture S6 known from EP-A 2 687 534 (comparative example V6) shows better efficacy but despite a lower usage amount causes markedly higher emissions in the VDA-278 test. The inventive flame retardant preparation B4 shows better efficacy than the mixture S4 present therein alone and shows low emissions and less fogging condensate and therefore exhibits the best profile of properties.

TABLE 5

Raw materials and usage amounts for producing flexible polyester polyurethane foams

| Component | Function | Description | Parts by mass |
|---|---|---|---|
| A | Polyol | Desmophen ® 2200 B (Covestro AG), polyester polyol with OHN of 60 mg KOH/g | 100 |
| B | Blowing agent | water | 4.0 |
| C | Catalyst | Niax ® A-30 (Momentive), bis(2-dimethylaminoethyl) ether | 0.25 |
| D | Catalyst | Addocat ® 117 (LANXESS Deutschland GmbH), tertiary amine | 0.25 |
| E | Stabilizer | Tegostab ® B 8324 (Evonik), silicone stabilizer | 1.0 |
| F1 | Flame retardant | Fyrol ® PNX | see table 6 |
| F2 | Flame retardant | Flame retardant preparation V9 | see table 6 |
| F3 | Flame retardant | Mixture V4 | see table 6 |
| F5 | Flame retardant | Inventive flame retardant preparations B4 | see table 6 |
| G | Diisocyanate | Desmodur ® T 80 (Covestro AG), tolylene diisocyanate, isomer mixture | 24.1 |
| H | Diisocyanate | Desmodur ® T 65 (Covestro AG), tolylene diisocyanate, isomer mixture | 24.1 |

OHN = hydroxyl number according to DIN 53240

Production of Flexible Polyester Polyurethane Foams

The raw materials for producing flexible polyester polyurethane foams and the usage amounts thereof are reported in table 5. The usage amounts of the flame retardants were varied systematically, see above. The raw materials with the exception of the two diisocyanates (components G and H) were stirred together to form a homogeneous mixture. The two premixed diisocyanates were then added and the mixture briefly subjected to intensive stirring. After a cream time of 10-15 s and a full-rise time of 70-80 s a flexible polyester polyurethane foam having an envelope density of 29 kg/m$^3$ was obtained. The foam structure of the flexible polyester polyurethane foams depended on the flame retardants used. Said structure is reported in table 6 as "uniformly fine-celled" ("uf") or "nonuniformly coarse-celled" ("nc"). A comparative foam without flame retardant had a uniformly fine-celled foam structure and burned rapidly (flammability rating RB).

TABLE 6

Foam structure and efficacy of the flexible polyester polyurethane foams

| Example | Flame retardant | Foam structure | Efficacy (minimum amount for flammability rating BR in php) | Efficacy (minimum amount for flammability rating SE in php) |
|---|---|---|---|---|
| V4 | Mixture S4 according to EP-A 3388479 | uf | 5 | 7 |
| B4 | Inventive flame retardant preparation B4 | uf | 4 | 7 |
| V7 | Fyrol ® PNX | nc | — | — |
| V9 | Flame retardant preparation V9 | nc | — | — |

Evaluation of Results for Flexible Polyester Polyurethane Foams

The comparative examples V7 and V9 show that flame retardants based on Fyrol® PNX are not suitable for the production of flame retardant polyester polyurethane foams. The produced foams had a nonuniformly coarse-celled foam structure and were unusable.

By contrast, the mixture S4 according to EP-A 3388479 (comparative example V4) makes it possible to produce the desired uniformly fine-celled foam structure. However the flame retardancy is worse than for the mixture S6 according to EP-A 2 687 534 (comparative example V6). The inventive flame retardant preparation B4 likewise shows good compatibility with the polyester polyol and exhibits a slightly improved efficacy compared to the mixture S4.

What is claimed is:

1. A preparation comprising:
   i) a mixture comprising poly(alkylene phosphates) of formula (I)

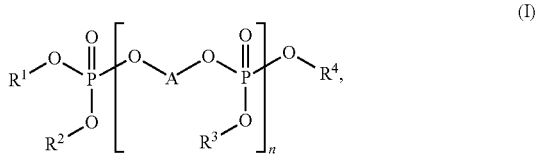

in which
   $R^1$, $R^2$, $R^3$ and $R^4$ each independently of one another represent an n-butyl radical or a 2-methylpropyl radical,
   A represents a radical of formula —$CHR^5$—$CHR^6$—(O—$CHR^7$—$CHR^8$)$_a$—,
   in which
   a represents an integer from 1 to 5 and
   $R^5$, $R^6$, $R^7$ and $R^8$ independently of one another represent hydrogen or methyl,
   and
   n represents an integer from 0 to 100,
   with the proviso that the poly(alkylene phosphates) of formula (I) present in the mixture differ from one another at least in the number n of repeating units and
   the weighted average of the number of repeating units $\bar{n}$ of the poly(alkylene phosphates) of formula (I) is 1.10 to 4.00,
   and
   ii) at least one cyclic phosphonic ester of formula (II)

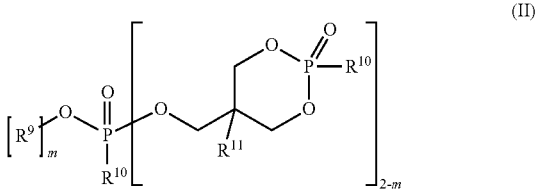

in which
   $R^9$, $R^{10}$ and $R^{11}$ each independently of one another represent a straight-chain or branched $C_1$- to $C_4$-alkyl radical and
   m represents the number 0 or 1.

2. The preparation according to claim 1, wherein in the radical of formula —$CHR^5$—$CHR^6$—(O—$CHR^7$—$CHR^8$)$_a$—, a represents the number 1.

3. The preparation according to claim 1, wherein $R^5$, $R^6$, $R^7$ and $R^8$ are all identical and represent hydrogen.

4. The preparation according to claim 1, wherein $R^1$, $R^2$, $R^3$ and $R^4$ are all identical and represent n-butyl radicals.

5. The preparation according to claim 1, wherein $R^1$, $R^2$, $R^3$ and $R^4$ are all identical and represent 2-methylpropyl radicals.

6. The preparation according to claim 1, wherein the weighted average of the number of repeating units $\bar{n}$ of the poly(alkylene phosphates) of formula (I) is in the range from 1.20 to 3.00.

7. The preparation according to claim 1, wherein the mixture comprising poly(alkylene phosphates) of formula (I) has a molar mass distribution as determined by gel permeation chromatography against polystyrene standards with tetrahydrofuran as the eluent, wherein in the molar mass distribution the area fraction of poly(alkylene phosphate) of formula (I) where n=1 is 10 to 70 area percent.

8. The preparation according to claim 1, wherein $R^9$, $R^{10}$ and $R^{11}$ independently of one another represent methyl or ethyl.

9. The preparation according to claim 1, wherein $R^9$ and $R^{10}$ both represent methyl and R11 represents ethyl.

10. The preparation according to claim 1, wherein the preparation contains at least one cyclic phosphonic ester of formula (II) where m=0 and at least one cyclic phosphonic ester of formula (II) where m=1.

11. The preparation according to claim 1, wherein the preparation contains 60% to 99.9% by weight of the mixture comprising poly(alkylene phosphates) of formula (I) and 0.1% to 40% by weight of the at least one cyclic phosphonic ester of formula (II) based on the total preparation.

12. The preparation according to claim 11, wherein the preparation contains 70% to 99% by weight of the mixture comprising poly(alkylene phosphates) of formula (I) and 1% to 30% by weight of the at least one cyclic phosphonic ester of formula (II) based on the total preparation.

13. The preparation according to claim 1, wherein the preparation has a dynamic viscosity of 20 to 1000 mPa·s at 23° C.

14. The preparation according to claim 1, further comprising one or more auxiliaries selected from the group consisting of solvents, antioxidants, stabilizers and dyes.

15. The preparation according to claim 1, further comprising one or more flame retardants distinct from the poly(alkylene phosphates) of formula (I) and from the at least one cyclic phosphonic ester of formula (II).

16. A process for producing polyurethanes, comprising reacting organic polyisocyanates with compounds having at least 2 isocyanate-reactive hydrogen atoms in the presence of the preparation according to claim 1 and in the presence of one or more blowing agents, stabilizers, and/or activators at 20° C. to 80° C.

17. A method of providing flame retardancy to a polyurethane, comprising preparing the polyurethane in the presence of the preparation according to claim 1.

* * * * *